April 25, 1950 W. E. THIBODEAU 2,505,015
ARC SCRIBE
Filed July 13, 1945 2 Sheets-Sheet 1
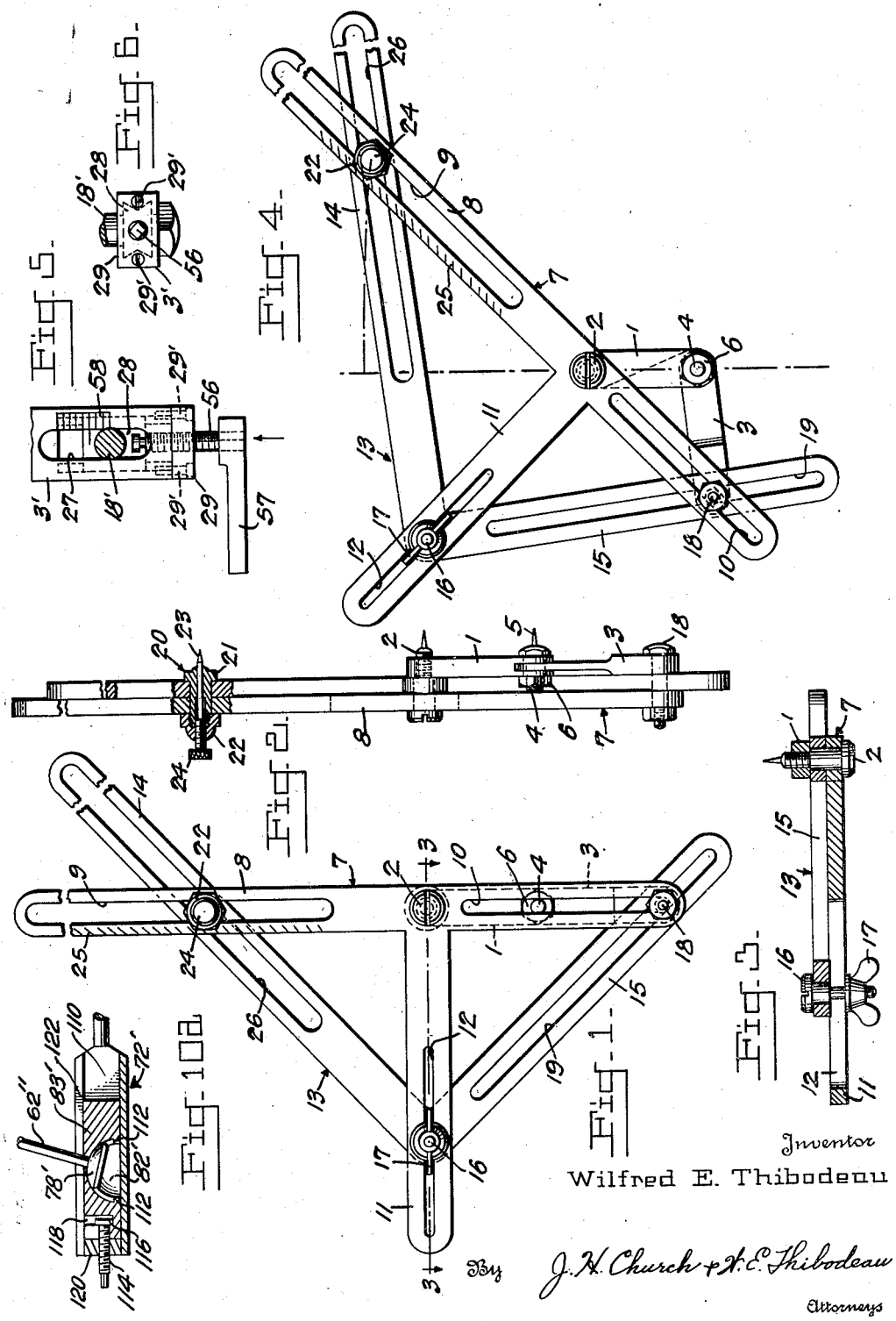
Inventor
Wilfred E. Thibodeau April 25, 1950 W. E. THIBODEAU 2,505,015
ARC SCRIBE
Filed July 13, 1945 2 Sheets-Sheet 2
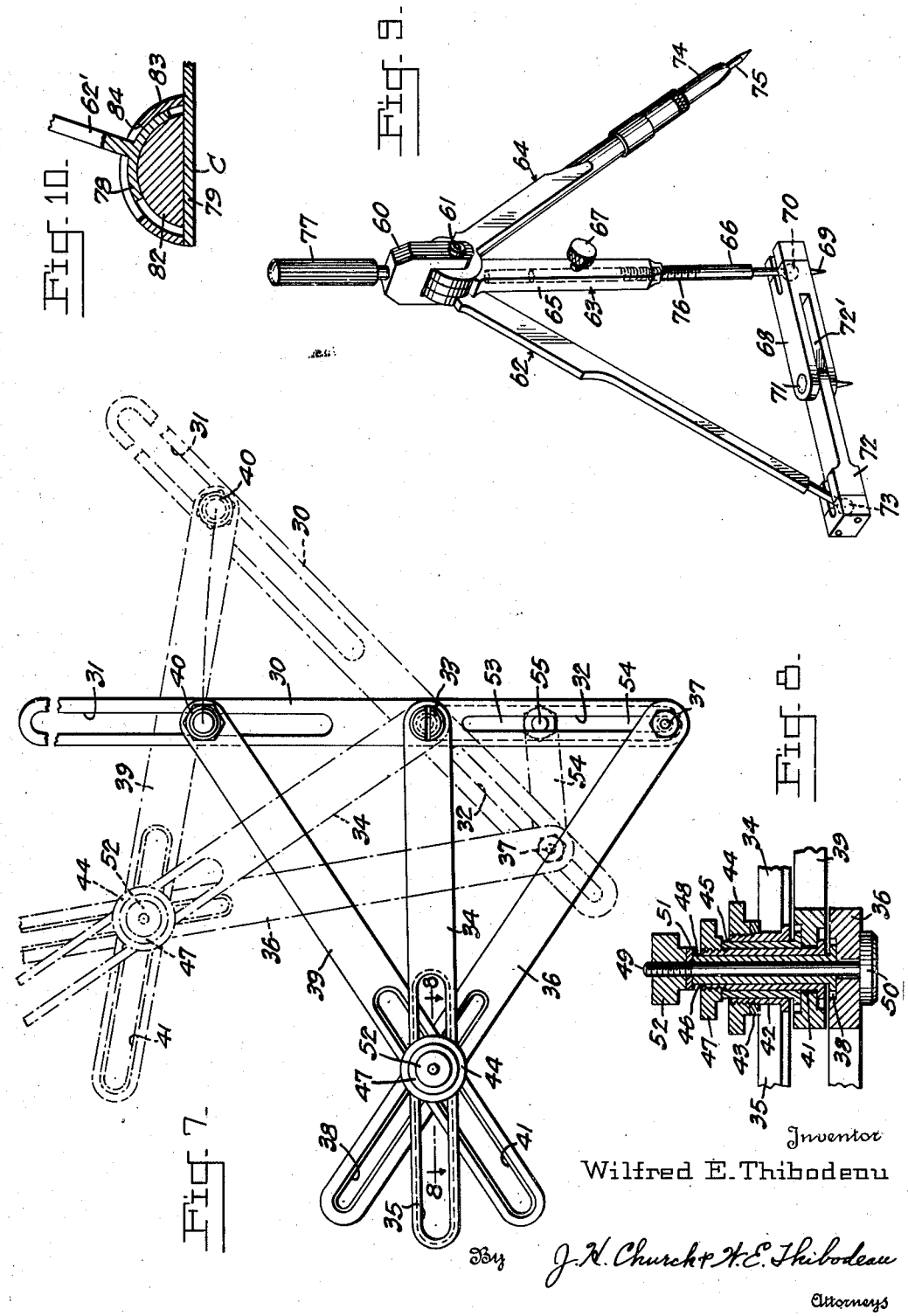
Inventor
Wilfred E. Thibodeau

UNITED STATES PATENT OFFICE 2,505,015

ARC SCRIBER

Wilfred E. Thibodeau, Franklin Township, Summit County, Ohio

Application July 13, 1945, Serial No. 604,952

5 Claims. (Cl. 33—27)

(Granted under the act of March 3, 1883, as amended April 30, 1928; 370 O. G. 757)

The invention described herein may be manufactured and used by or for the Government for governmental purposes without the payment to me of any royalty thereon.

This invention relates to devices for generating a circular arc from a point on the radius of its circle other than the true center.

The invention represents an improvement over my copending application Serial No. 597,925 filed June 6, 1945, now Pat. No. 2,499,427, granted March 7, 1950. Therein it was shown that the polar coordinates of an arc were related to the minimum polar distance as follows $$r = r_0 \frac{A+1}{\cos \alpha + \sqrt{A^2 - \sin^2 \alpha}} \quad (1)$$

and it was further shown that the denominator of the right hand member of the equation is solvable by a set of articulated arms having effective lengths of $n$ and $nA$ respectively where $n$ is any number and $$A = \frac{R}{R - r_0}$$

$R$ being the radius of the arc and $r_0$ the minimum polar distance from the polar origin.

The present invention materializes the polar coordinate by viewing Equation 1 as a constant product of two variables such that $rD = r_0 D_0 = k$. Thus, if two intercepts on a straight line are varied inversely so that their product remains constant while at the same time one intercept is varied as a function of the angle of rotation of said line about a fixed point thereon in accordance with the aforesaid denominator of the right hand side of Equation 1, then a terminus of the other intercept will generate the arc of a circle having a radius determined by the particular value of A to the scale selected.

It is therefore an object of the invention to provide an instrument operable to generate a true arc of a circle having its center at a remote, inaccessible or inconveniently located point, by setting the scriber at any given distance from any chord.

Another object is to provide an instrument for generating or describing the arc of a circle of long radii from a point on a radius of such circle other than its true center.

A further object is to provide an instrument of the type mentioned that is in the general form of and usable in the general manner of an ordinary pair of drawing compasses.

A still further object is to provide an arc-generating instrument that is accurate, relatively inexpensive, and easy to construct and operate while at the same time adjustable for a wide range of radii.

Other objects and advantages will become apparent as the description proceeds.

In the drawings:

Fig. 1 is a plan view of one form of the improved instrument with the parts shown in the relation they will assume at the start of a curve-plotting operation.

Fig. 2 is an elevational view looking from right to left, Fig. 1, with the parts in initial adjustment, Fig. 3 is a section taken upon the line 3—3, Fig. 1, and showing more particularly the means for fixing the instrument in adjusted position, Fig. 4 is a view corresponding to Fig. 1 but showing the parts in the relation they assume during the generation of an arc, Fig. 5 is a view showing an adjustable pivot whereby the effective length of one of the sides of the basic triangle may be varied, Fig. 6 is an end view looking in the direction of the arrow, Fig. 5, with the adjusting lever removed for greater clarity of illustration, Fig. 7 is a plan view of another species wherein initial adjustment is effected by a special pivot joint interconnecting the arms of the instrument, Fig. 8 is an enlarged section taken on the line 8—8 of Fig. 7 and showing the construction of the pivot point, Fig. 9 is a perspective view of another species of the invention in which the instrument is constructed in the general form of a pair of drawing compasses, Fig. 10 is a sectional view of a modified form of universal mounting for the legs of the instrument shown at Fig. 9, and Fig. 10a is a fragmentary sectional view, showing a modification of the arrangement of Fig. 10.

In Figs. 1 to 4, inc., I have shown a form of the improved instrument wherein 1 identifies a link of unit effective length to any convenient scale, adapted to be fixed in position upon a surface upon which an arc is to be described. Fixation at one end is effected by a headed pivot screw 2 having a pointed or sharpened end. The other end is slotted to receive a relatively thin portion of a link 3 of effective length A. The links 1 and 3 are pivotally connected by a pivot bolt 4 having a fixation point 5 extending from its head and held in place by a nut 6. A guide member 7 consists of a straight link 8 having its ends slotted, as at 9 and 10 and being pivoted on the smooth shank portion of pivot 2 at the junction of said link 8 with an arm 11 conveniently at right angles to link 8. The outer end of arm 11 is slotted, as at 12. A guide member 13 has right-angularly related arms 14 and 15 and each arm is slotted for a substantial portion of its length as clearly shown upon Fig. 1 and 4.

Member 13 has an aperture or pivot hole at the junction of its arms 14 and 15 and a bolt 16 has an enlarged smooth shank portion fitting this aperture and a second reduced shank portion slidably fitting the slot 12. The enlarged shank portion is slightly greater in length than the thickness of guide member 13 so that when wing nut 17 is turned down, arm 11 is firmly clamped to bolt 16 to fix the point of pivoting of member 13. At the same time, said member may freely pivot on the bolt.

The end of link 3 opposite its connection to unit link 1, has the same thickness as link 1 and is apertured to receive a pivot bolt 18 that also passes through slot 10 in link 8 and slot 19 in arm 15 to thereby materialize an intersection of link 8 and arm 15 at a distance from pivot bolt 4 equal to the predetermined distance A. Furthermore it will be noted that, because of the fixation point 5 when the instrument is in operating position, the axis of bolt 18 is constrained to a circular path about the axis of bolt 4.

The link 8 and arm 14 intersect and the intersection may be materialized by a scriber or stylus element 20 including a barrel 21, Fig. 2, having a shank smoothly fitting the slots in link 8 and arm 14 and held in position by a cap 22 threaded onto an end of barrel 21. The barrel has a central axial bore for receiving a lead or stylus 23, and an adjusting screw 24 is threaded into cap 22 and may be turned down to feed the lead 23 forwardly, as desired. Indicating graduations 25 may be provided along one edge of link 8 for the purpose of setting the radius desired.

The species just described operates upon the principle that the altitude of a triangle with right angled apex is the mean proportional between the segments of the base determined by the altitude. Hence Equation 2 written in the form $rD = r_0D_0 = k$ is satisfied for all positions of the instrument since for each position, the product of the distances D between the axis of pivot 2 and bolt 18, and r between pivot 2 and stylus element 20 is constant. Hence it is necessary only to materialize the distance D in accordance with denominator on the right hand side of Equation 1 to obtain the distance r, of Equation 1. It was fully explained in my prior co-pending application identified above that where the effective length of link 1 is made equal to unit distance to the scale selected, and the effective length of link 3 is made equal to A to the same scale, and link 1 remains fixed during an arc-describing operation while link 3 rotates about its pivot axis with link 1; the distance between the remote ends of the two links is given by the aforesaid denominator of Equation 1.

The operation of the instrument will be clear from the foregoing description. Usually it will be desired to describe an arc of known radius through a point lying upon a certain radius, the true center of the arc being inaccessible or in an inconveniently located position such as outside of the confines of a drafting board. The instrument is adjusted so that links 1, 3 and 8 are in alignment, as shown in Fig. 1, wing nut 17 is loosened and guide member 13 is given a combined translation along slot 12 and rotation about bolt 18 until the known or desired radius is indicated upon scale 25 by an edge of arm 14. The wing nut is then tightened to fix bolt 16 in adjusted position along slot 12. Next the instrument is positioned with scriber or stylus 23 on the point through which the arc is to pass and with the aligned axes of links 1, 3 and 8 extending along the radius of the arc through such point. The fixation points of link 1 are forced into the supporting surface and guide member 7 is rotated about screw 2. Fig. 4 shows the position of the parts after the arc L has been partly described. It will be noted that, during the describing procedure, pivot bolt 18 slides along slots 10 and 19 to decrease the distance between pivots 2 and 18 in accordance with the basic formula of Equation 1 while concomitantly therewith the distance between pivot 2 and stylus 23, that is, the value r, is increased in the proper ratio such that the stylus or scriber 23 describes the desired arc. It will be understood that the instrument operates equally well in either the first or second quadrants and may be swung counterclockwise or clockwise, as desired, to describe a complete arc.

Figs. 5 and 6 show a construction whereby the effective length of link 3 may be varied. In these figures 3' identifies a link corresponding to link 3 of Figs. 1-4, and having a slot 27 in its end. This slot may be of cross-sectional shape suitable to guide a pivot block 28 for translation therealong. A pivot 18' similar in purpose and function to pivot bolt 18, Fig. 1, is secured within an aperture in block 28 with its shank projecting upwardly through slot 27. A cap 29 is secured by screws 29' across the open end of slot 27 and has threaded therein an adjusting screw 56 swiveled at one end to block 28 and having its other end squared to detachably receive an adjusting wrench 57. A scale 58 may be provided along slot 27 for coaction with an indicator mark upon block 28, to enable accurate determination of the effective length of link 3. When such a construction is employed slot 10, is of course, made sufficiently long to accommodate the maximum outward adjustment of block 28. The value of the effective length of link 3 is given by $$A = \frac{R}{R - r_0}$$

where R is the radius of the circle and $r_0$ is the minimum height of the arc.

In Figs. 7 and 8, I have shown another species of the invention wherein 30 identifies a link having slots 31 and 32 adjacent opposite ends and a pivot screw 33 intermediate its ends. Screw 33 has a fixation point similar to that of screw 2, Fig. 1. A first arm 34 is pivoted at one end upon screw 33 and has a slot 35 formed in its other end. A second arm 36 is pivoted at one end upon a pivot bolt 37 slidably fitting slot 32. At its other end arm 36 has a slot 38. A third arm 39 is pivoted at one end upon a scriber or stylus element 40 that may be identical with element 20 used in the species of Figs. 1-4. Arm 39 likewise has a slot 41 and a special pivot element passes through the superposed slots 35, 38 and 41 to pivotally and slidably associate the arms.

The pivot element is shown in Fig. 8 and includes a first sleeve 42 having a flange at its lower end of a size to fit between the shouldered edges of slot 35, and also having its opposite end threaded. The sleeve is of sufficient length to accommodate a washer 43 and nut 44 so that, when the nut is turned down the sleeve is firmly clamped to arm 34 in adjusted position along slot 35. A second sleeve 45 fits within sleeve 42 and has a flange at its lower end slidably fitting between the upper shouldered walls of arm 39. This sleeve 45 has a length such that its plain upper end extends a few thousandths of an inch above the adjacent end of sleeve 42. A third sleeve 46 fits within sleeve 45 and has a flanged lower end slidably fitting between the lower shouldered walls of slot 41 and a threaded upper end projecting about the adjacent end of sleeve 45. A nut 47 is threaded upon sleeve 46 so that, when turned down, the flanges upon sleeves 45 and 46 are drawn together to clamp arm 39 therebetween and fix the axis of the pivot in adjusted position along slot 41. A fourth sleeve 48 fits within sleeve 46 and has a flange at its lower end fitting between the shouldered walls of slot 38 in arm 36. A pivot bolt 49 fits within sleeve 48 and has a head 50 engaging the lower surface of arm 36 and a threaded upper end receiving a washer 51 and nut 52. Sleeve 48 projects a few thousandths of an inch above the adjacent end of sleeve 46 so that when nut 52 is turned down, arm 36 is clamped between the flange upon sleeve 48 and head 50.

By the pivot construction just described, with nuts 44, 47 and 52 loosened, the arms 34, 36 and 39 may freely slide relatively to the pivot axis defined by bolt 49 and the four concentric sleeves. When any nut is tightened the corresponding arm is clamped in position relatively to the aforesaid pivot axis but at the same time, is free to pivot thereabout. Thus adjustment may be effected, as desired, to clamp all links against sliding relatively to the pivot axis, or to permit one or two of the links to slide while the others are clamped to prevent such sliding.

A unit link 53 is pivoted at one end upon pivot screw 33 and at its other end is pivotally connected with rotating link 54 by means of a pivot bolt 55. The latter bolt may be identical with bolt 4, Fig. 4, so that when its fixation point, as well as that of screw 33 is forced into the supporting surface, link 53 is held in fixed position upon the surface. The other end of link 54 is pivotally associated with bolt 37. It will be understood that links 53 and 54 have effective lengths, that is lengths between pivot axes, determined as fully explained in my copending application previously identified. If desired a scale of radii of arcs to be drawn may be applied to link 30 along slot 31, for coaction with an indicator on stylus element 40, to gauge the initial or starting position of the stylus relatively to said link.

In use, the pivot 50 is set in slot 35 to give convenient lengths to arms 36 and 39 to reach the extremities of the desired arc. The effective lengths of arms 36 and 39 should be equal. Pivots 33 and 55 are now fixed in the line of the minimum height of the desired arc with 33 at the foot of said height, and pivot 40 is set at the desired value of $r_0$. Link 30 is then rotated about 33 as a center. As such rotation takes place, the bolt 37 slides along slot 32 because of the continuous deformation of the triangle determined by links 53 and 54. Since this triangle and that determined by arms 34 and 36 have a side in common, and since the effective lengths of the arms 34 and 36 are now fixed, the deformation of the triangle determined thereby results in a change in the altitude thereof, that is, the perpendicular distance of the axis of bolt 49 from link 30. Inasmuch as arm 39 has its effective length fixed at this time, the aforesaid change is accommodated by a sliding movement of element 40 along slot 31. The parts are shown in dotted lines in the relation they assume during the generation of an arc L.

This form is based on the geometric principle that intersecting chords of a circle present segments having a constant product. Obviously the parameter determining this constant product is solely the distance of the point of intersection from the center of the circle. Thus, in Fig. 7, since arms 36 and 39 remain constant and equal, the arm 30 between pivots 37 and 40 is always a chord of a circle having a radius equal to the effective lengths of arms 36 and 39. And since the length of arm 34 is fixed the point of intersection of the various chords (i. e. pivot 33) is equidistant from the center of the circle and the instrument reflects the geometric premise set forth above.

Fig. 9 shows a form of the invention generally resembling a pair of compasses wherein the arms of a yoke have aligned apertures mounting a pivot pin 61. Three legs 62, 63 and 64 have enlarged apertured ends pivotally mounted upon pin 61 between the arms of yoke 60. The leg 63 is formed in two sections 65 and 66. As shown, section 65 has an axial bore within which the other section 66 is slidable. A set screw 67 is provided in section 65 to secure the sections in axially adjusted positions. The lower end of section 66 is formed with a ball 70 received within a spherical socket formed in the end of unit link 68 whereby leg 63 may pivot universally relatively to link 68.

Link 68 has a fixation point 69 in alignment with the center of ball 70 and a second fixation point formed upon and coaxially with a pivot pin 71 passing between apertures in the slot 72' of link 68. A second or "A" link 72 has one end reduced and apertured to smoothly fit within slot 72 and to pivot on pin 71. The other end of link 72 is enlarged to provide a socket for a ball 73 upon the lower end of leg 62 whereby this leg may pivot universally with respect to link 72. The leg 64 is formed as a conventional scriber leg of a compass and may have a sleeve 74 adapted when turned down, to grip a scriber 75 in axially adjusted position. The effective lengths of 62 and 64 are equal.

The section 66 may be screwthreaded as shown at 76 for fine adjustment into upper member 65. In use, the set screw is loosened, scriber 75 is set at the proper value of $r_0$ and the set screw then tightened. The scriber may be moved by screwing section 66 into 65. Set screw 67 is then tightened. Now with links 68 and 72 in alignment on the radius of the minimum height of the arc and with all parts substantially in the relation shown at Fig. 9, the instrument is swung about leg 65. During this movement link 72 moves about pivot pin 71 so that the distance between the centers of balls 70 and 73 satisfies the terms of the basic equation. Furthermore, the aforesaid distance varies reciprocally with the distance between ball 70 and scriber 75 so that as scriber 75 rotates, its distance from the center of ball 70 is continuously changed to traverse the arc of a circle of the desired radius.

In Fig. 10 I have shown a construction for universally mounting the legs 62 and 63, Fig. 9, where maximum accuracy is necessary or desired. In this figure 62' indicates a leg that may correspond to leg 62, Fig. 9. This leg has a plate attached to its lower end and formed as a portion of a spherical shell with center at C. A circular base plate 79 has a central core 82 having its outer surface formed as a portion of a sphere with center at C. A shell 83 formed as a portion of the surface of a sphere with center at C is secured to plate 79. This shell has a circular opening 84 therein slightly less in angular extent than plate 78 and is spaced from core 82 by a radial distance to afford a smooth sliding fit of plate 78 therebetween. By the construction shown, leg 62" is universally mounted about a center lying in the supporting surface so that any error otherwise introduced by having said center somewhat above the surface, is obviated. It will be understood that a similar mounting is contemplated for leg 63, Fig. 9.

Thus, in Fig. 10a there is shown a portion of a link 72' corresponding to link 72 in Fig. 9. Corresponding to what is shown in the case of Fig. 5, the link 72' is slotted as at 110 to receive a sliding block 83". This block performs the same function as shell 83 in Fig. 10 in that it accommodates the spherical shell segment 78'. The latter slides on a partial sphere 82" which, in this case, is attached to block 83' as at 112. A screw 114 has a head 116 insertable in a slot 118 in block 83', and is threaded in an end block 120 carried by link 72'. As the screw 114 is turned, block 83' moves along slot 110 to vary the effective length of link 72'. Graduations 122 may be employed, either to indicate the effective length of the link or to indicate the ratio of $R$ to $r_0$.

The effect of varying the relative lengths of these links is to vary the ratio of $R$ to $r_0$ and the effect of varying the length of 63 is to vary $r_0$ alone. Thus, a ratio of $R$ to $r_0$ may be set into the instrument, say $R/r_0=10$, or such ratio may be built into the instrument. Then all that is necessary is to select the proper value of $r_0$ (1 inch if a 10 inch radius is desired) and scribe the arc.

With respect to the modification shown in Figures 7 and 9 it should be noted that the equal legs 62 and 64 may be made adjustable to accommodate various spans which may be required and that Fig. 7 while showing adjustable legs 36 and 39 may well be employed with legs of fixed length as in Fig. 9 such length being adapted to cover a particular desired range which the instrument may be called upon to provide.

It will be observed that the basic concept of my invention resides in materializing two intercepts upon a straight line and in varying said intercepts so that the product thereof remains constant. At the same time, one intercept is varied as a function of the angle of rotation of said straight line, in accordance with the basic equation so that the combined rotation and translation of a point materializing a terminus of the other intercept, traverses the desired arc. Numerous alterations, substitutions and modifications within the aforesaid basic concept, will be obvious or will readily occur to those skilled in the art. Therefore, I do not wish to be limited to the precise details of construction shown for they are illustrative only. To the contrary, I wish to reserve all such changes, modifications, and substitutions of equivalents as fall within the scope of the subjoined claims.

It will be understood that while all modifications have been shown as generating an arc in a plane, the same principles may with but minor changes be applied (and such is within the contemplation of this application) to devices generating a surface of a sphere.

As explained in my aforesaid earlier application, whereas an instrument with scriber has been shown by way of illustration, the invention is not limited thereto, but may be employed in any task where an arc is to be generated and includes any device, for instance carrying a tool such for instance as a grinder, cutter, miller, polisher, acetylene torch, etc., or may be employed as a purely mechanical movement of a machine part in an arcuate path.

Having now fully disclosed the invention, what I claim and desire to secure by Letters Patent is:

1. An arc scriber comprising a pair of arms pivoted together for coplanar, angular displacement relative one to the other, a third arm co-pivoted with said pair of arms for similar angular displacement, a first link universally pivoted to the distal end of one of said pair of arms, scriber means on the other of said pair of arms, and a second link universally pivoted to the distal end of the third arm, said links having a mutual pivot intermediate their universally mounted ends, said pair of arms having substantially equal effective lengths reckoned from their point of co-pivoting, the plane of said arms being normally positionable to include the axis of said mutual pivot when said links are aligned.

2. An arc scriber comprising a pair of arms pivoted together for substantially coplanar, angular displacement relative one to the other, a third arm co-pivoted with said pair of arms for similar angular displacement, a first link universally pivoted to the distal end of one of said pair of arms, and a second link universally pivoted to the distal end of the said third arm, said links having a mutual pivot intermediate their universally pivoted ends, and said pair of arms having substantially equal effective lengths, reckoned, respectively, from their common pivot axis, to the center of the universal mounting of one of said pair of arms, and to the distal end of the other of said pair of arms.

3. A device as in claim 2, said links having co-planar faces on the side remote from the co-pivoted ends of said arms, and the center of turning of said arms in their universal mountings coinciding with said co-planar faces.

4. A device as in claim 2 wherein said third arm comprises means for varying its effective length.

5. In a device as in claim 2, means for varying the lengths of the links relative one to the other.

WILFRED E. THIBODEAU.

REFERENCES CITED

The following references are of record in the file of this patent:

UNITED STATES PATENTS

| Number | Name | Date |
|---|---|---|
| 759,566 | Stout | May 10, 1904 |
| 880,796 | Horrocks | Mar. 3, 1908 |
| 1,010,612 | Garinger | Dec. 5, 1911 |

FOREIGN PATENTS

| Number | Country | Date |
|---|---|---|
| 4,155 | Great Britain | Dec. 18, 1873 |
| 16,698 | Great Britain | July 20, 1911 |
| 540,266 | France | Apr. 14, 1922 |